United States Patent
Petrick et al.

[11] 3,911,292
[45] Oct. 7, 1975

[54] COCKCROFT-WALTON CASCADE CIRCUIT FOR VOLTAGE MULTIPLICATION

[75] Inventors: Paul Petrick; Hans-Peter Schwedler, both of Landshut; Alfred Holzer, Schonbrunn, all of Germany

[73] Assignee: Ernst Roederstein Spezialfabrik, Landshut, Germany

[22] Filed: Dec. 10, 1973

[21] Appl. No.: 423,574

[30] Foreign Application Priority Data
Dec. 21, 1972 Germany............................ 2262804

[52] U.S. Cl. ................. 307/235; 307/257; 307/110; 328/26
[51] Int. Cl.² ......................................... H03K 17/00
[58] Field of Search ........ 328/26, 78; 307/110, 235, 307/257; 321/15; 317/258, 260

[56] References Cited
UNITED STATES PATENTS

| | | | |
|---|---|---|---|
| 2,213,199 | 9/1940 | Bouwers et al. ....................... | 321/15 |
| 3,363,156 | 1/1968 | Cox..................................... | 317/260 |
| 3,457,478 | 7/1969 | Lehrer.................................. | 317/260 |
| 3,463,992 | 8/1969 | Solberg................................. | 307/110 |
| 3,699,410 | 10/1972 | Maylandt............................ | 317/258 |
| 3,714,528 | 1/1973 | Vail.................................... | 317/260 |

FOREIGN PATENTS OR APPLICATIONS
1,123,762  2/1962  Germany

*Primary Examiner*—John S. Heyman
*Assistant Examiner*—B. P. Davis
*Attorney, Agent, or Firm*—Jerry Cohen; Charles Hieken

[57] ABSTRACT

A Cockcroft-Walton cascade circuit comprises an input voltage source and a pumping and storage circuit with a series array of capacitors with pumping and storage portions of the circuit being interconnected by silicon rectifiers, constructed and arranged so that at least the capacitor nearest the voltage source, and preferably one or more of the next adjacent capacitors in the series array, have lower tendency to internally discharge than the capacitors in the array more remote from the voltage source.

3 Claims, 1 Drawing Figure

U.S. Patent  Oct. 7,1975  3,911,292
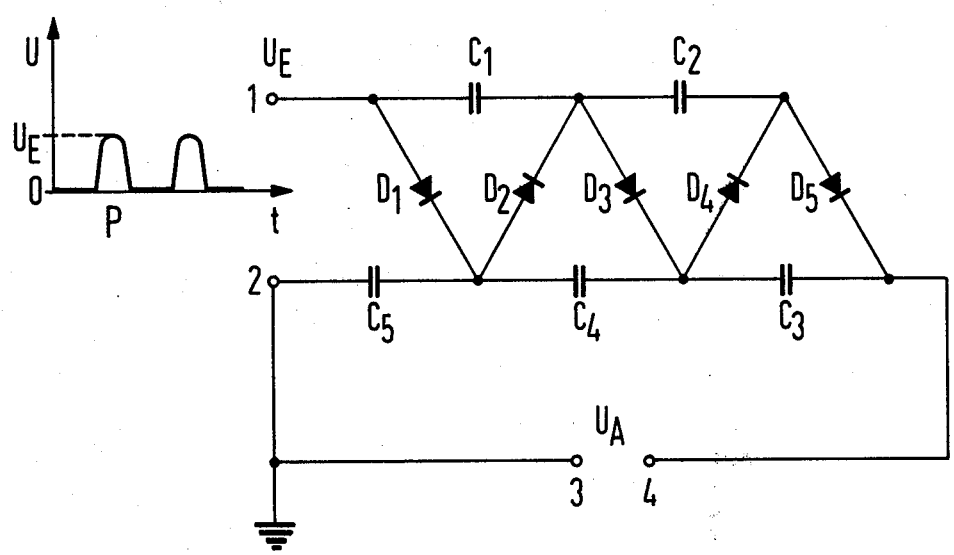

COCKCROFT-WALTON CASCADE CIRCUIT FOR VOLTAGE MULTIPLICATION

BACKGROUND OF THE INVENTION

The invention relates in general to Cockcroft-Walton cascade circuits for voltage multiplication and more particularly to such circuits with a pumping circuit and a storage circuit composed of capacitors connected in series, said pumping circuits and storage circuit being linked with one another by a rectifier circuit whose rectifiers are preferably silicon rectifiers, especially for a switching arrangement sensitive to internal discharges of capacitors, and more especially a switching arrangement containing transistors, and especially an image tube switching arrangement.

Voltage multiplication cascades composed of capacitors and rectifiers are used to produce high D.C. voltages from sinusoidal or pulsed alternating voltages. All known voltage multiplication cascades and voltage multipliers are designed to be capacitance-symmetrical, i.e., all capacitors used have the same capacitance. If U for example is the maximum value of an applied alternating voltage, the input capacitor connected directly to the alternating voltage source is charged to a D.C. voltage with a value U, while all other capacitors are charged to the value of 2U. Therefore, a total voltage can be obtained from the series-connected capacitors of a capacitor array.

In voltage multipliers, internal resistance is highly significant. In order to obtain high load currents on the D.C. side, the emphasis in the prior art has been on constructing voltage multipliers with internal resistances that are as low as possible.

Internal resistance of voltage multipliers can be reduced by increasing the capacitances of the individual capacitors by equal amounts. However, the critical significance of size of the assembly in the practical application of a voltage multiplier, limits the extent to which capacitance of the individual capacitors can be increased as a practical matter.

In television sets, especially color television sets, voltage multiplication cascades are required whose internal resistance is generally 400 to 500 kOhms. Thus far, it has been possible to achieve this low internal resistance with small dimensions only by using silicon diodes as rectifiers and metallized film capacitors as the capacitors.

When silicon rectifiers are used to achieve low internal resistance, their low forward resistance produces high peak currents and therefore leads to problems involving the pulse resistance of the capacitors. Metallized film capacitors are used because of space requirements, i.e., in order to ensure that the assembly will have the smallest possible dimensions, and also for cost reasons. These film capacitors have a self-healing effect, in which the damage caused to the capacitor by partial evaporation of the metal coating around the point of puncture (pinhole), which develops as a result of internal spark-overs, is cured again. This selfhealing effect is highly desirable as far as the capacitors themselves are concerned, but is not without its disadvantages as far as the other cirucit components are concerned, especially the silicon rectifiers, the image tubes, and the components which conduct the image tube voltage.

It is therefore an important object of the invention to improve voltage multiplication cascades of the type described above.

It is a further object of the invention to keep the size of the entire assembly small and the internal resistance low.

It is a further object of the invention to increase pulse resistance of the entire circuit.

It is a further object of the invention to avoid the above-described disadvantageous effects on adjacent elements.

It is a further object of the invention to achieve multiples of the foregoing objects and preferably all of them consistent with each other.

SUMMARY OF THE INVENTION

In accordance with the invention, the foregoing objects are met by making at least one of the capacitors in the pumping circuit, preferably including the one which is adjacent to the input voltage source, one which is less prone to internal discharges than any of the individual capacitors in the storage circuit.

The Cockcroft-Walton cascade circuit is not provided with identical capacitors. Instead, the individual capacitors are arranged according to their loads and designed in such a way that a higher pulse resistance is attained only in certain capacitors. It can be shown that the load produced by the voltage in all the capacitors in the multiplication circuit is approximately the same. But the pulse currents of the capacitors as well as their forward flow angles are different. In particular, the capacitors of the pumping circuit are subjected to very high loads in a pulsed mode. In the voltage multiplication cascade according to the invention, these capacitors are arranged so that they exhibit fewer internal discharges than the capacitors in the storage circuit.

The external dimensions of the entire assembly would be unacceptably large if one constructed the entire switching arrangement using such capacitors.

The voltage multiplication cascade according to the invention also makes it possible to construct a reliably operating arrangement which has no tendency toward spark-overs, consistent with satisfactory internal resistance of the voltage multiplication cascade and small dimensions of the entire assembly. This avoids the above cited disadvantages with respect to the particularly sensitive components in the rest of the circuit and makes it possible to design voltage multiplication cascades with silicon rectifiers, which are characterized by long lifetimes. Hence, a voltage multiplication cascade has been developed particularly for image tube circuits in television sets, especially color television sets, and this cascade satisfies the highest requirements in addition to having an average lifetime which in every case is greater than that of the television set.

A further aspect of the invention is that at least one of the capacitors that are less prone to internal discharges is a capacitor which is impregnated with a high-voltage impregnating substance, especially a high-voltage oil such as polybutene or silicone oil, or mixtures thereof. In contrast to capacitors made of metallized film which have not been impregnated, this allows the discharge frequency due to internal discharges or spark-overs to be reduced by a factor of 10 to 100.

According to a further important aspect of the invention, at least one of the capacitors that are less prone to internal discharges is either a foil capacitor or a selfhealing capacitor. In addition, the capacitor in the pumping circuit which is adjacent to the voltage source input can be a foil capacitor which has been impregnated in the manner described above, while the next capacitor in the pumping circuit is a self-healing capacitor impregnated in the same fashion.

Other objects, features and advantages of the invention will be apparent from the following detailed description of preferred embodiments, taken in connection with the accompanying drawing, the single FIGURE of which:

BRIEF DESCRIPTION OF THE DRAWING is a schematic diagram of a circuit made according to a preferred embodiment of the invention.

DETAILED DESCRIPTION OF PREFERRED EMBODIMENTS

The voltage multiplier comprises capacitors $C_1$ to $C_5$ and rectifiers $D_1$ to $D_5$ connected in a cascade. An alternating voltage source $U_E$ is connected to terminals 1 and 2, said voltage source supplying for example a pulsed alternating voltage. Capacitors $C_1$ and $C_2$ form the pumping circuit while capacitors $C_3$, $C_4$ and $C_5$ form the storage circuit.

In the steady state, capacitor $C_1$ is charged to the maximum value of the alternating voltage $U_E$ as are the other capacitors $C_2$ to $C_5$. The desired high D.C. voltage $U_A$ is picked off at terminals 3 and 4, said D.C. voltage being composed of the D.C. voltages from capacitors $C_3$ to $C_5$. Terminal 3 and terminal 2 are connected to one pole of the alternating voltage source $U_E$ feeding the circuit, which can be at ground potential. In the circuit described here, a D.C. voltage $U_A$ can be picked off whose voltage value is approximately 3 times the maximum value of the pulsed alternating voltage $U_E$. By using more than five capacitors, a correspondingly higher D.C. voltage can be obtained.

The individual capacitors are discharged by disconnecting D.C. voltage $U_A$. However, they are constantly being recharged by the electrical energy supplied by the alternating voltage source $U_E$, so that the voltage multiplier can be continuously charged on the output side.

According to the invention, in this preferred embodiment, capacitor $C_1$ and/or $C_2$ in the pumping circuit are designed so that they have a lower tendency toward internal discharges than any of the individual capacitors $C_3$, $C_4$ and $C_5$ in the storage circuit.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. An improved voltage multiplying circuit comprising,
   first and second input terminals for receiving unipolar pulses therebetween,
   an output terminal
   at least first and second storage capacitors connected in series between said second terminal and said output terminal,
   at least first, second and third unilaterally conducting devices connected in series and poled in the same sense with the first of said devices connected from said first input terminal to the junction of said first and second storage capacitors,
   and at least a first pumping capacitor connected from said first input terminal to the junction of said second and third unilaterally conducting devices,
   said third unilaterally conducting device being connected between said first pumping capacitor and said second storage capacitor,
   said first pumping capacitor having means for establishing lower tendency toward internal discharges than characterizes said storage capacitors to provide good electrical performance as a voltage multiplying circuit within a physical assembly smaller than that which would characterize a voltage multiplying circuit consisting of both pumping and storage capacitors each having the same tendency toward internal discharges.

2. An improved voltage multiplying circuit in accordance with claim 1 wherein said first pumping capacitor is a self-healing impregnated capacitor which is impregnated with a high voltage impregnant.

3. An improved voltage multiplying circuit in accordance with claim 1 wherein said first pumping capacitor comprises a foil capacitor.

* * * * *